United States Patent [19]

Wolf

[11] Patent Number: 4,817,371

[45] Date of Patent: Apr. 4, 1989

[54] INDIVIDUAL-MOTOR DRIVE METHOD OF AND APPARATUS FOR SPINDLES OF A SPINNING MACHINE

[75] Inventor: Horst Wolf, Albershausen, Fed. Rep. of Germany

[73] Assignee: Zinser Textilmaschinen GmbH, Ebersbach/Fils, Fed. Rep. of Germany

[21] Appl. No.: 61,877

[22] Filed: Jun. 11, 1987

[30] Foreign Application Priority Data

Jun. 11, 1986 [DE] Fed. Rep. of Germany ....... 3619647

[51] Int. Cl.[4] .............. D01H 1/244; D01H 1/20; D01H 1/22
[52] U.S. Cl. ............................. 57/100; 57/78; 57/93; 57/94
[58] Field of Search ............ 57/80, 78, 81, 92–97, 57/100, 105, 264, 266

[56] References Cited

U.S. PATENT DOCUMENTS

| | | | |
|---|---|---|---|
| 3,443,373 | 5/1969 | Bryan | 57/100 X |
| 3,704,579 | 12/1972 | Tooka et al. | 57/100 X |
| 3,738,095 | 6/1973 | Lohest | 57/100 |
| 3,785,140 | 1/1974 | Muller | 57/100 |
| 3,791,128 | 2/1974 | Landwehrkamp et al. | 57/100 X |
| 3,936,998 | 2/1976 | Wolf | 57/100 |
| 4,163,359 | 8/1979 | Honjo | 57/93 |
| 4,314,388 | 2/1982 | Hartsmannsgruber et al. | 57/92 X |
| 4,336,684 | 6/1982 | Hartsmannsgruber et al. | 57/100 X |

*Primary Examiner*—Donald Watkins
*Attorney, Agent, or Firm*—Herbert Dubno; Ronald Lianides

[57] ABSTRACT

To decrease the time required for spindles of a spinning machine to reach their normal operating speeds after a yarn breakage or the like, where the spindles are individually driven by respective asynchronous motors individual to the spindles, the alternating current source whose frequency defines the speed of the motor is temporarily brought to a voltage above the normal operating voltage and the voltage step-up is then terminated.

15 Claims, 1 Drawing Sheet

INDIVIDUAL-MOTOR DRIVE METHOD OF AND APPARATUS FOR SPINDLES OF A SPINNING MACHINE

CROSS-REFERENCE TO RELATED APPLICATIONS

This application is related to my commonly owned copending applications Ser. No. 06/819,541 filed Jan. 16 1986 and still pending, Ser. No. 06/828,838 filed Feb. 12, 1986 and now issued as U.S. Pat. No. 4,679,389, Ser. No. 06/834,627 filed Feb. 27 1986 and now issued as U.S. Pat. No. 4,691,508, Ser. No. 06/858,937 filed Apr. 30, 1986 and still pending, Ser. No. 06/861,533 filed May 5 1986 and now issued as U.S. Pat. No. 4,699,208, Ser. No. 06/887,101 filed July 10, 1986 and now issued as U.S. Pat. No. 4,730,448, Ser. No. 06/914,113 filed Oct. 1, 1986 and now issued as U.S. Pat. No. 4,738,095, and Ser. No. 07/034,004 filed Apr. 1, 1987 and now issued as U.S. Pat. No. 4,736,580.

FIELD OF THE INVENTION

My present invention relates to a method of and an apparatus for driving individual drive spindles of a spinning machine and, more particularly, to the individual drive of such spindles, through the use of an asynchronous electric motor which can be turned off and on and which drives an individual spindle, each of the spindles of the spindle machine being provided with a respective such motor.

BACKGROUND OF THE INVENTION

Individually driven spindles of a spinning frame or machine can be provided with respective suitable asynchronous motors which are fed from a supply-current source with a supply-current at a frequency which determines the drive speed of the motor and with a voltage which is in a certain ratio to that frequency at the operating speed of the motor.

The term "operating speed" is here used to refer to the speed of the motor and of the spindle during normal spinning operations. This operating or nominal speed is generally constant over the operating duration and deviations from this operating speed generally occur only on shutdown or start-up of the motor or spindle.

After a yarn break has been cleared at an individual spindle which is usually brought to a standstill during the process of clearing the yarn break, it is necessary to accelerate the spindle to its operating speed corresponding to the speed of the remaining operating spindles and, to avoid flaws in the yarn, this acceleration is generally done at a high rate. The duration over which the spindle is accelerated to its operating speed normally is about three seconds and the operating speed usually is between 8,000 and 20,000 RPM.

It is, therefore, important, as a rule, with spinning machines, to accelerate the individual spindles after elimination of a yarn breakage to the normal operating speed in the briefest possible time span.

With textile spindles having whorls which are driven by tangential-belt drives, it has already been proposed to accelerate the spindle to normal operating speed by providing mechanically an enhanced coupling of the whorl to the belt and thus a more efficient transfer of displacement to the whorl by the belt utilizing an increased pressing force of the whorl against the belt or vice versa over at least the greater part of the acceleration period. Such a system is described, for example, in German Open Application DE-OS No. 34 13 764.

Obviously, this technique cannot be utilized where the spindle is substantially directly coupled to an individual motor.

OBJECTS OF THE INVENTION

It is, therefore, the principal object of the present invention to provide an individual-motor drive system for individual spindles which allows an increased acceleration of the spindle to normal operating speed from standstill following yarn breakage.

Another object of the present invention is to provide an improved method of operating an individual spindle drive which permits its acceleration to normal operating speed at a faster rate than has hitherto been the case.

It is also an object of the invention to provide an improved apparatus for driving individual spindles which permits them to be brought to operating speed more quickly than has been possible heretofore.

A further object is to provide an improved method of driving a spindle of a spinning machine to achieve the goals enumerated above.

SUMMARY OF THE INVENTION

These objects and others will become more readily apparent hereinafter in a method of and an apparatus for individually driving the spindles of a spinning machine with respective asynchronous motors whose normal operating speeds are determined by a frequency of a current-feed source connected to these motors and which are energized by a voltage of the feed current in a given ratio to the frequency for normal operating-speed drive of the respective motor.

According to the invention, the ratio of applied voltage to frequency is increased above this given or predetermined ratio during the period in which the speed of the motor is increased, i.e. the motor and spindle are accelerated, following a thread breakage, until the operating speed is reached.

The invention utilizes the principle that for each asynchronous motor there is a defined voltage-frequency ratio at which the magnetic flux in the motor is optimal for driving the latter under load at the operating speed for a spinning operation.

As a rule, upon a change in the supply frequency to alter the speed, a supply-voltage change which is proportional to the change in frequency is required as well.

With the present invention, I break with this proportional relationship between the applied voltage and the supply frequency during the interval of acceleration so that the given ratio is significantly increased and I have, therefore, found that this brings the asynchronous motor up to speed far more quickly than has been possible with the usual rate of increase in the frequency and the corresponding increase in supply voltage at the aforementioned ratio. Of course, in accordance with the invention, the supply voltage is reduced, once the operating speed and frequency have been reached, to restore the given ratio.

For a limited time, therefore, according to the invention, corresponding to the duration of acceleration to operating speed from standstill, the applied voltage-supply current ratio is temporarily increased above the normal value, i.e. above the given ratio described for normal operation.

Apparently, the increased applied voltage generates higher torque and allows the curve of speed versus time to incline upwardly more steeply, thereby reducing the run-up time from standstill to normal operating speed of the individual spindle.

Surprisingly, this increase in voltage need not burn out the motor and has been found not to have any detrimental effects.

Since it appears that the operating speed is determined exclusively by the supply frequency, the application of the higher speed voltage does not bring the speed of the motor above the operating speed provided, of course, the supply frequency is not increased beyond the normal operating frequency. This is one of the advantages of using an asynchronous motor in accordance with the invention.

Naturally, the increased applied voltage results in an increased loss at the motor and, therefore, increased heating thereof, the increased applied voltage should not be impressed upon the motor any longer than is necessary to bring the spindle from standstill to operating speed. I have found that the normal range of durations wherein this can be accomplished is such that the application of the increased voltage for such durations does not detrimentally effect the motor or its operations.

According to a feature of the invention, a plurality of asynchronous motors can be coupled to a single supply current source and the respective spindles can be thereby driven as a group. In this group drive, all of the asynchronous motors can be brought from standstill to operating speed simultaneously or, according to a feature of this invention, individually without significantly effecting the speed of the other members of the group.

In that case, the supply frequency for normal operating speed can be simply impressed upon the motor at standstill and the applied voltage from the source can be increased to all of the motors in the group. These motors which are running at operating speed are not affected by the increased voltage whereas the motor which is being accelerated is found to have its rate of acceleration significantly increased over that which normally obtains when the source is connected to a motor at standstill and has its voltage and frequency in the aforementioned given ratio.

This, of course, provides additional simplification since it eliminates the need for individual voltage-adjustable feed current sources for the individual motors and allows a single voltage-adjustable feed source to be used for a number of asynchronous motors.

It has been found to be advantageous, in some cases, to initiate the application of the increased voltage, i.e. to step the voltage of the source, at the instant at which the supply to the asynchronous motor to be brought to standstill is cutoff and to maintain the increased voltage until at least the asynchronous motor which was brought to standstill is again accelerated to operating speed.

Alternatively, it is possible to provide a time delay between the cutoff of the latter motor and the application of the voltage step. It is also possible, of course, to trigger the voltage step simultaneously with reenergization of the asynchronous motor which is at a standstill.

The termination of the voltage step can be in response to the measurement of the speed of the asynchronous motor in question or based upon a time factor, i.e. the normal duration of acceleration.

The voltage step can amount to a voltage increase of 20 to 70% above the operating voltage, although best results are obtained with a voltage step of 30 to 50% above the operating voltages.

The apparatus for carrying out the method of the invention can include a cut-on switch or a cutout switch on or coupled to the asynchronous motor which can be connected to the supply current source and can temporarily increase via a suitable control circuit the output voltage thereof The control circuit can include a time-delay network for delaying the initiation of the voltage step-up deenergization of the motor and/or for cutting of the increased voltage at a predetermined time after the voltage step has been initiated.

A sensor can be provided for the motor to cutoff the voltage step as noted.

BRIEF DESCRIPTION OF THE DRAWING

The above objects, features and advantages of my invention will become more readily apparent from the following description, reference being made to the accompanying drawing in which.

SPECIFIC DESCRIPTION

Figure 1:
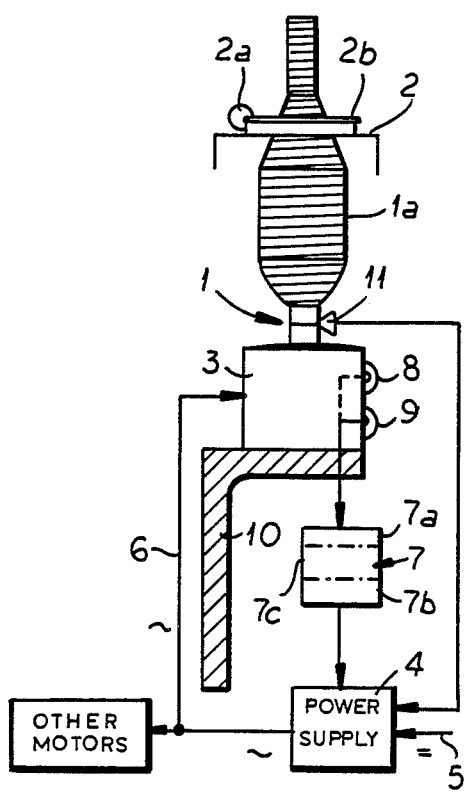
FIG. 1 is a diagram of the apparatus of the invention, in an elevational view as applied to a single spindle of a spinning machine.

In FIG. 1 1 have shown a single station of a ring station of a running spinning machine which has only partly been illustrated.

On the spindle bank 1a, motors 3 are mounted, each of which is directly connected to a respective spindle 1 carrying a yarn bobbin la which is orbited by a traveler 2a guided on a traveler ring 2b on the upwardly and downwardly displaceable ring bank 2. The principles of operation of such a spinning machine are well known and need not be detailed here. Each of the asynchronous motors 3 has a switch 8 which can be referred to as an "on" switch and a switch 9 which can be referred to as an "off" switch. In addition, if desired, a tachometer 11 can be provided for measuring the speed of the spindle and the controlling variable-voltage power supply 4 therewith.

The switches 8 and 9 serve, respectively, for initiating and terminating the voltage step.

The asynchronous motors are connected via lines represented at 6 with the supply-current source 4 and receive from the latter a supply current at a given alternating current frequency, the source 4 having its voltage output adjustable.

Depending upon whether the source 4 is supplied through line 5 with DC or AC, it can be a reformer (i.e. DC-to-AC converter) or a frequency converter (i.e. an AC-to-AC converter).

In any case, the supply voltages of the source 4 is independent of the output frequency of the latter.

The switches 8 and 9 of the asynchronous motors are connected to respective control units which may include a voltage control circuit 7c preceded by a time-constant or time-delay network 7a and followed by a time-constant or time-delay network 7b.

The control unit 7 is designed to regulate the output voltage of the source 4 so that temporarily the voltage output thereof is increased by a step which amounts to 20 to 70%, preferably, 30 to 50% of the normal operating voltage which, of course, is in a fixed or given ratio to the normal operating frequency of the source for corresponding to the drive of the motor at its normal operating spinning speed.

Figure 2:
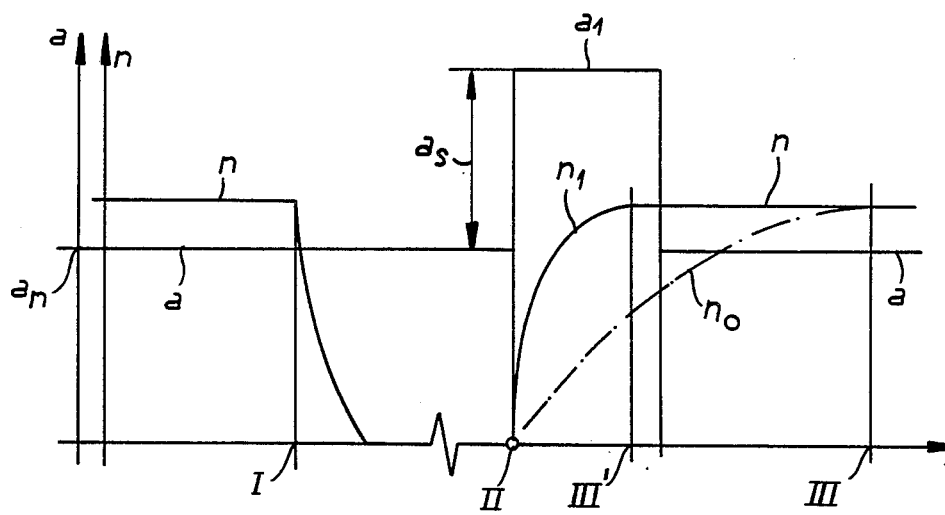
FIGS. 2–5 are graphs showing the characteristic curves of the applied voltage and the spindle speed of asynchronous motors according to the invention.

The effect of this is shown in FIG. 2.

In FIG. 2 the time t is represented along the abscissa while the ordinate a represents the supply voltage for the asynchronous motor and the ordinate n represents the spindle speed.

As is apparent, at the point in time represented at point I, the spindle motor is shutoff to permit correction of a yarn breakage, the speed (ordinate n) falling to zero. Upon correction of the yarn breakage, the spindle is driven again from standstill beginning at point II.

The dot-dash line $n_o$ shows the acceleration to normal speed with the normal operating voltage being applied at the normal operating frequency. The normal operating speed is achieved at the point III. According to the invention, at the point in time II, the supply voltage a is increased from its normal value $a_n$ to an increased value $a_1$ in a voltage step whose height is represented at $a_s$ and corresponds to 20 to 70% of the normal operating voltage $a_n$. The rate at which the speed rises to the normal operating speed is shown in the solid-line curve $m_1$ which is substantially steeper than the curve $n_o$ so that the normal operating speed is reached at point III'. The increased voltage $a_1$ generates a higher torque to permit inertia to be overcome more readily and this shortens the interval between the points II and III'.

Figure 3:
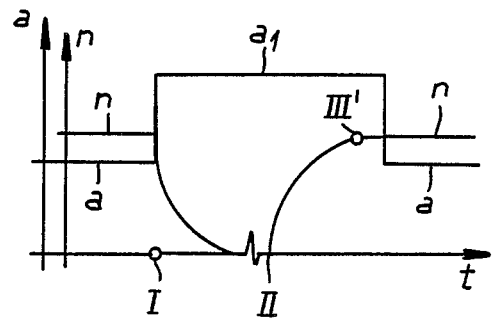
Figure 4:
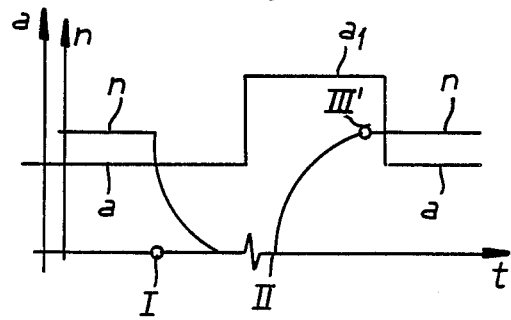
Figure 5:
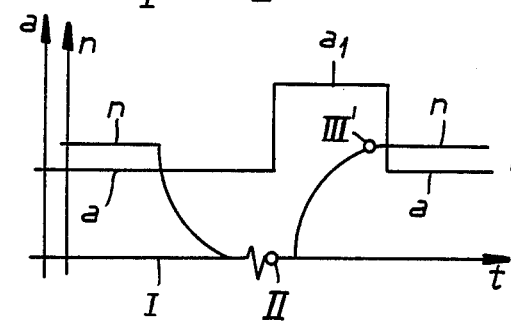

The graphs of FIGS. 3–5 correspond to the graph of FIG. 2 and show different ways in which the voltage step can be initiated and terminated.

In FIG. 3, for example, the time-delay circuit 7a provides zero time delay and the control unit 7 is activated when the shutoff switch 9 operates so that as seen when the motor is shut down at point I, the voltage generated by the supply 4 is increased to the level $a_1$ so that the higher voltage step is already in place when the asynchronous motor is switched on again at point II. This may be disadvantageous in some cases where the interval between points I and II is very long. In that case, the time-delay network 7a may have a significant time constant so that the pattern shown in FIG. 4 is reached.

In that case, the voltage step-up is delayed after the operation of switch 9 to a point shortly before the switch-on point II and thus the period over which the voltage step-up is applied is significantly reduced. As seen in FIG. 5, moreover, it is possible to couple the "on" switch 8 to the control unit 7 so that the switch-on point II coincides with application of the voltage step-up.

A time delay can be provided for then switching on the motor itself by the duration required to bring the voltage of the source up to the maximum level of the step.

The time-delay circuit 7b determines the duration of the voltage step-up and in the case of FIG. 3 will be somewhat longer than the duration of standstill and in every case can be slightly greater than the time required to bring the spindle up to the operating speed.

When, of course, the tachometer 11 is used, the time-delay circuit 7b need not be employed and cutoff of the voltage step-up can be effected solely in response to the attainment of the normal operating speed by the spindle.

I claim:

1. A method of operating a spinning machine having individual spindles and a respective asynchronous motor connected to each spindle and adapted to drive the spindle at an operating spinning speed upon application at a given supply frequency of a current source determining the speed of the motor and being associated with an operating voltage such that at said operating speed, each motor is operated with a given voltage-frequency ratio, said method comprising the steps of:

at least over a substantial portion of time for acceleration of the respective spindle to said operating speed from standstill, applying to the respective motor an increased supply voltage to thereby reduce the duration time until the motor reaches said operating speed; and thereafter terminating the voltage increase in response to the attainment of said operating speed by the spindle being accelerated.

2. The method defined in claim 1 wherein said source supplies current to a group of asynchronous motors driving respective spindles, the increased voltage being applied to all asynchronous motors of the group to which the motor of the spindle to be accelerated belongs.

3. The method defined in claim 1 wherein an increased voltage is generated at said source concurrently with the cutoff of the asynchronous motor of the spindle to be accelerated.

4. The method defined in claim 1, further comprising the step of delaying the generation of the increased voltage by said source by a time-delay interval after cutoff of the motor of the spindle to be accelerated.

5. The method defined in claim 1 which comprises the step of switching on the increased voltage of said source concurrently with the switching on of the asynchronous motor of the spindle to be accelerated.

6. The method defined in claim 1, further comprising the step of delaying the switching on of the motor of the spindle to be accelerated for a time-delay interval subsequent to the development of said increased voltage at said source.

7. The method defined in claim 1 wherein the application of increased voltage by said source is terminated in response to the lapse of a predetermined time interval.

8. The method defined in claim 1 wherein the increased voltage amounts to 20 to 70% of the normal voltage.

9. The method defined in claim 8 wherein the increased voltage amounts to 30 to 50% of the normal voltage.

10. In a spinning machine having a spindle bank with at least one spinning spindle and a respective asynchronous electric motor individual to said spindle and establishing a normal spinning speed of said spindle at a normal operating frequency applied to said motor by a supply current source having a normal operating voltage forming a given voltage-frequency ratio for said motor at said operating speed, the improvement which comprises switch means for said motor; means connecting said switch means with a supply current source for temporarily increasing the voltage outputted by said source during an acceleration phase of said motor from standstill to said normal operating speed so that the duration time to reach normal operating speed from standstill is reduced; and means for monitoring the speed of said spindle for determining when said normal operating speed is reached.

11. The method defined in claim 10 wherein said means connecting said switch means with said source includes a control unit having a time-delay network responding to said switch means for delaying the generation of increased voltage by said source after operation of said switch means.

12. The machine defined in claim 11 wherein said switch means includes an "off" switch for cutting off said motor, said control unit initiating said increased voltage following operation of said "off" switch.

13. The machine defined in claim 11 wherein said switch means includes an "on" switch for said motor.

14. The machine defined in claim 10 wherein said means connecting said switch means to said source includes a timing network for cutting off said increased voltage at a given point in time subsequent to the increase in said voltage.

15. The machine defined in claim 10 wherein said means for monitoring the speed of said spindle is connected to said source for cutting off the increased voltage when said spindle attains said operating speed.

* * * * *